United States Patent
Chen et al.

(10) Patent No.: US 11,549,001 B2
(45) Date of Patent: Jan. 10, 2023

(54) MALTO-DEXTRIN COMPOSITION WITH LOW DE VALUE AND LOW VISCOSITY AND METHOD FOR MAKING THE SAME

(71) Applicants: Loren Chen, Shanghai (CN); Yi Cai, Shanghai (CN)

(72) Inventors: Loren Chen, Shanghai (CN); Fenfen Fang, Shanghai (CN)

(73) Assignees: Loren Chen, Shanghai (CN); Yi Cai, Shanghai (CN)

( * ) Notice: Subject to any disclaimer, the term of this patent is extended or adjusted under 35 U.S.C. 154(b) by 0 days.

(21) Appl. No.: 17/139,251

(22) Filed: Dec. 31, 2020

(65) Prior Publication Data

US 2021/0206949 A1 Jul. 8, 2021

Related U.S. Application Data

(63) Continuation of application No. PCT/CN2020/070726, filed on Jan. 7, 2020.

(51) Int. Cl.
*C08B 37/02* (2006.01)
*C08L 5/02* (2006.01)
*C08B 37/00* (2006.01)

(52) U.S. Cl.
CPC .......... *C08L 5/02* (2013.01); *C08B 37/0003* (2013.01); *C08B 37/0021* (2013.01)

(58) Field of Classification Search
CPC .... C08L 5/02; C08B 37/0003; C08B 37/0021
USPC ........................................................ 536/115
See application file for complete search history.

(56) References Cited

U.S. PATENT DOCUMENTS

| | | | | |
|---|---|---|---|---|
| 4,717,662 A | * | 1/1988 | Montgomery | C12N 9/2417 435/188 |
| 5,141,859 A | * | 8/1992 | Niimi | C12P 19/14 435/100 |
| 2006/0269679 A1 | * | 11/2006 | Patil | C09D 105/14 427/421.1 |
| 2015/0037844 A1 | | 2/2015 | Lee et al. | |
| 2020/0157592 A1 | | 5/2020 | Li et al. | |

FOREIGN PATENT DOCUMENTS

| | | | |
|---|---|---|---|
| CN | 102766666 A | | 11/2012 |
| CN | 103667388 A | | 3/2014 |
| CN | 108841896 A | | 11/2018 |
| CN | 110169488 A | * | 8/2019 |
| CN | 111349669 A | | 6/2020 |
| WO | 2006-047176 A1 | | 5/2006 |

OTHER PUBLICATIONS

Kong et al. (Industrial Crops & Products 123 (2018) 687-697).*
Ji et al.; CN 110169488 A; Aug. 27, 2019 (Machine-English Translation).*
Syrup process technology (www.syrupmachine.com, Mar. 12, 2018).*
Syrup process technology (www.syrupmachine.com, Nov. 4, 2017).*
Dokic et al. (Colloids and Surfaces A: Physicochemical and Engineering Aspects 141 (1998) 435-440).*
PCT International Search Report and the Written Opinion dated Oct. 10, 2020, issued in related International Application No. PCT/CN2020/070726 (9 pages).
Hao Xin-lei et al., "Studies on the Composition and Gelatination Properties of Low-DE Maltodextrin", Cereal & Feed Industry, Dec. 31, 2009, No. 7, pp. 24-26, with English abstract.
Shi Chuan-yue et al. Preparation Process Optimization of Low DE Maltodextrin by Response Surface Method Technology & Development of Chemical Industry Mar. 31, 2019, No. 3, vol. 48, pp. 4-7, with English abstract.
F. Avaltroni et al., "Maltodextrin Molecular Weight Distribution Influence on the Glass Transition Temperature and Viscosity in Aqueous Solutions", Carbohydrate Polymers, vol. 58, 2004, pp. 323-334.
P. Dokic et al., "Molecular Characteristics of Maltodextrins and Rheological Behaviour of Diluted and Concentrated Solutions", Colloids and Surfaces, A: Physicochemical and Engineering Aspects, vol. 141, 1998, pp. 435-440.
Shifeng Yu et al., "Relationship Between Intrinsic Viscosity, Thermal, and Retrogradation Properties of Amylose and Amylopectin", Czech J. Food Sci., vol. 32, No. 5, 2014, pp. 514-520.
Office Action and Search Report dated Jul. 28, 2021, issued in related Taiwan Application No. 110100609, with partial English translation (5 pages).

* cited by examiner

*Primary Examiner* — Jonathan S Lau
*Assistant Examiner* — Michael C Henry
(74) *Attorney, Agent, or Firm* — Sheppard Mullin Richter & Hampton LLP

(57) ABSTRACT

A malto-dextrin composition with low DE value and low viscosity and the method for making the same is provided. The malto-dextrin comprises a blue value in the range of 0.02 to 0.28; a dextrose equivalent (DE) in the range of 3 to 10; and a viscosity lower than $26.3185*DE^{(-0.7593)}$. The method for preparing the malto-dextrin composition comprises: dispersing raw starch in water to obtain a starch-water slurry; preheating the starch-water slurry with a jet-cooker for a first duration at a first temperature above 100° C. having a temperature variation no more than 0.8° C.; hydrolyzing the slurry by treating the slurry with α-amylases for a second duration at a second temperature; and filtering the hydrolyzed slurry to remove insoluble residual proteins and fibers and obtain an un-fractionated malto-dextrin composition.

13 Claims, 4 Drawing Sheets

MALTO-DEXTRIN COMPOSITION WITH LOW DE VALUE AND LOW VISCOSITY AND METHOD FOR MAKING THE SAME

CROSS REFERENCE TO RELATED APPLICATIONS

The present application is a continuation of International Application No. PCT/CN2020/070726, filed with the China Intellectual Property Office on Jan. 7, 2020, and titled "MALTO-DEXTRIN COMPOSITION WITH LOW DE VALUE AND LOW VISCOSITY AND METHOD FOR MAKING THE SAME", the content of which is incorporated herein in its entirety.

TECHNICAL FIELD

This invention relates generally to the field of processed food composition containing dextrin, and more specifically, to a malto-dextrin composition with low DE value and low viscosity and method for making the same.

BACKGROUND

Malto-dextrin materials have been commonly used as an intermediate material for further hydrolysis to produce glucose, maltose and other smaller carbohydrate products. In the meantime, due to the relative low production cost, relative inert chemical reactivity, odor less and taste less characteristics, malto-dextrin has been widely used as filler, bulking agents in formulations for food products, pharmaceutical products, and for many other industrial applications. Starches from various sources such as corn, tapioca, potato, and are abundantly available in the US, China, South East Asia, Brazil in relatively low cost. Occasionally, starches from rice and wheat are also used for malto-dextrin production.

For industry use, two of the most important physical characteristics for malto-dextrin are (a) the dextrose equivalent (DE value); and (b) viscosity, as both have major impact on the processability of the malto-dextrin. Specifically, malto-dextrin with high DE value tends to have low viscosity, and the formulation is easy to process when whet, but the final dry product is more likely to pick up moisture; while malto-dextrine with low DE value tend to have high viscosity, and while the final product can easily stay dry, the formulation is very difficult to handle when wet.

In the prior art, while there have been attempts to obtain malto-dextrin products with better controlled physical properties, specific guide to control viscosity with composition guide has been lacking. Specifically, there is no known methods in the prior art to produce malto-dextrine with low DE value and low viscosity, as such formulation would be easy to handle when wet and produce dry and flowable finished product.

It is to be noted that the above information disclosed in this Background section is only for facilitating the understanding of the background of this invention and therefore may contain information that does not form the prior art that is already known to a person of ordinary skill in the art.

SUMMARY

In view of the limitations of prior art technologies described above, the present invention provides a malto-dextrin composition with low DE value and low viscosity and the method for making the same that address the aforementioned limitations.

A first aspect of the present invention is directed to a malto-dextrin composition with low DE value and low viscosity. The malto-dextrin comprises a blue value in the range of 0.02 to 0.28; a dextrose equivalent (DE) in the range of 3 to 10; and a viscosity lower than $26.3185*DE^{(-0.7593)}$.

In some embodiments, the viscosity is lower than $26.3185*DE^{(-0.7593)}$ by at least 5%.

In some embodiments, the viscosity is in the range of 6.0 to 10.0 when the DE value is about 3.

In some embodiments, the viscosity is in the range of 5.5 to 8.5 when the DE value is about 4.

In some embodiments, the viscosity is in the range of 5.0 to 7.5 when the DE value is about 5.

In some embodiments, the viscosity is in the range of 4.75 to 6.5 when the DE value is about 6.

In some embodiments, the viscosity is in the range of 4.5 to 5.5 when the DE value is about 7.

In some embodiments, the viscosity is in the range of 4.25 to 5.25 when the DE value is about 8.

In some embodiments, the viscosity is in the range of 4.0 to 4.75 when the DE value is about 9.

In some embodiments, the viscosity is in the range of 3.75 to 4.55 when the DE value is about 10.

A second aspect of the present invention is directed to a malto-dextrin composition with low DE value and low polydispersity index (PDI). The malto-dextrin composition comprises a blue value in the range of 0.02 to 0.28; a dextrose equivalent (DE) less than 14; and a polydispersity index (PDI) in the range of 1.78 to 6.55.

In some embodiments, the PDI is less than 6.

In some embodiments, the PDI is less than 5.5.

In some embodiments, the PDI is less than 5.

In some embodiments, the viscosity is lower than $26.3185*DE^{(-0.7593)}$.

In some embodiments, the malto-dextrin composition is unfrationated.

In some embodiments, the PDI is less than 6.

In some embodiments, the PDI is less than 5.

In some embodiments, the PDI is less than 4.

In some embodiments, the viscosity lower than $26.3185*DE^{(-0.7593)}$.

A third aspect of the present invention is directed to a method for preparing the malto-dextrin composition with low viscosity. The method comprises dispersing raw starch in water to obtain a starch-water slurry; preheating the starch-water slurry with a jet-cooker for a first duration at a first temperature above 100° C. having a temperature variation no more than 0.8° C.; hydrolyzing the slurry by treating the slurry with α-amylases for a second duration at a second temperature; and filtering the hydrolyzed slurry to remove insoluble residual proteins and fibers and obtain an un-fractionated malto-dextrin composition.

In some embodiments, the jet-cooker is a Hydroheater®.

In some embodiments, the temperature variation is controlled by adjusting the Hydroheater® so that no hammering noise is audible.

In some embodiments, the temperature variation is no more than 0.5° C.

In some embodiments, the first temperature is in the range of 107.4 to 108.4° C.

In some embodiments, the first duration is between 3 to 5 minutes.

In some embodiments, the second temperature is in the range of 85~95° C.

In some embodiments, the second duration is in the range of 30 to 90 minutes.

In some embodiments, the α-amylase is selected from a group consisting of enzymes including *Bacillus stearothermophilus*, *Bacillus licheniformis*, and *Pseudomonas fluorescens* Biovar I.

In some embodiments, the un-fractionated malto-dextrin composition comprises a polydispersity index (PDI) in the range of about 1.78 to 6.55.

In some embodiments, the un-fractionated malto-dextrin composition comprises a DE in the range of 3 to 10, and a viscosity lower than lower than 26.3185*DE^(−0.7593).

In some embodiments, the method further comprises fractionating the un-fractionated composition with a ultra-filtration membrane having a molecular weight cut-off of between 4,000 Daltons to 20,000 Daltons to obtain a retentate and a permeate, wherein the retentate is retained as a fractionated malto-dextrin composition.

In some embodiments, the malto-dextrin composition comprises a DE in the range of 3 to 10, and a viscosity lower than 26.3185*DE^(−0.7593).

It is to be understood that both the foregoing general description and the following detailed description are exemplary and explanatory only and are not restrictive of this invention.

BRIEF DESCRIPTION OF THE DRAWINGS

The accompanying drawings, which are incorporated in and constitute a part of the description, illustrate embodiments consistent with this invention and, together with the description, serve to explain the disclosed principles. It is apparent that these drawings present only some embodiments of this invention and those of ordinary skill in the art may obtain drawings of other embodiments from them without exerting any creative effort.

DETAILED DESCRIPTION OF THE EMBODIMENTS

Exemplary embodiments will now be described more fully with reference to the accompanying drawings. However, these exemplary embodiments can be implemented in many forms and should not be construed as being limited to those set forth herein. Rather, these embodiments are presented to provide a full and thorough understanding of this invention and to fully convey the concepts of the exemplary embodiments to others skilled in the art. In addition, the described features, structures, and characteristics may be combined in any suitable manner in one or more embodiments. In the following detailed description, many specific details are set forth to provide a more thorough understanding of this invention. However, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

1. DE Value

Malto-dextrin is the hydrolysate from the enzymes (or acids) catalyzed hydrolysis reaction of gelatinized (dissolved) starch molecules with various molecular weights. The higher the extent of the hydrolysis reaction, the lower the molecular weights of malto-dextrin. On the other hand, the lower the extent of the hydrolysis reaction produces malto-dextrin with higher molecular weights malto-dextrin products. The DE values is based on the average molecular weight of the malto-dextrin, and has a major impact on the physical characteristics of the malto-dextrin.

(a) DE Values and Product Physical Characteristic Correlation

Table 1 summarizes the relationship between DE values and other physical characteristics of malto-dextrins.

TABLE 1

| DE | Extent of hydrolysis | Average molecular wt | viscosity | Hydroscopicity/water solubility |
|---|---|---|---|---|
| High | High | Low | low | high |
| Low | Low | High | high | low |

Some of the mostly commonly used malto-dextrins have the following DE values: DE 20, DE15, DE10, DE8, DE6, DE4.

(b) The Dilemma Using Malto-Dextrin Formulation

Many application/formulations necessitates the malto-dextrin going through both solution state and dried state. Specifically, many applications necessitates formulations during aqueous solution stage to mix active ingredient(s) along with fillers and/or other auxiliary agents before passing through the nozzle for spray drying to make the final products. During formulation stage, the low molecular weight malto-dextrin characteristics such as low viscosity is beneficial. However, after spray drying, the low hydrocopicity of the dried state would be much more appreciated for better stability and integrity of the final product form. Compromises always have to be made so the formulation can be easy to handle during processing stage as well as being dry and with physical strength in finished product stage.

(c) DE Value and Formulation/Product Characteristics.

Table 2 summarizes the relationship between DE values and formulation/product characteristics.

TABLE 2

| DE | viscosity | Formulation when wet | Final product |
|---|---|---|---|
| high | Low | Easy to process, passing through nozzle of spray dry | Product more likely to pick up moisture, gain weight, caking |

TABLE 2-continued

| DE | viscosity | Formulation when wet | Final product |
|---|---|---|---|
| low | high | High viscosity, more handling challenges | Dry, flow-able finished products |

2. Viscosity

Figure 1:
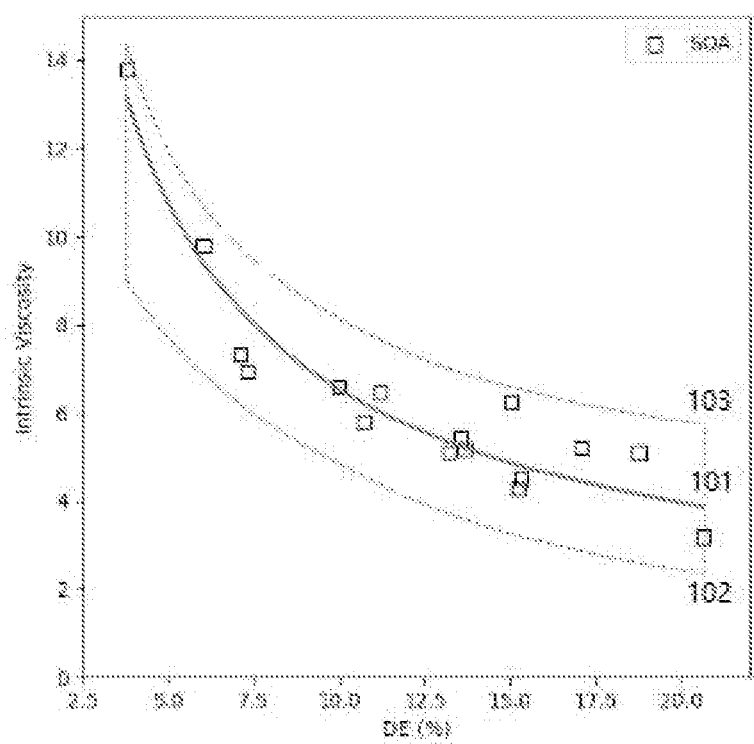
FIG. 1 is a scatter diagram showing the correlation of intrinsic viscosity at 30° C. and DE value of certain market samples.

The market samples with characterization data are listed in Table 3 and illustrated in FIG. 1, which is a scatter diagram showing the correlation of intrinsic viscosity at 30° C. and DE value of certain market samples. It is interesting to observe the PDI of the sixteen samples are averaged at 7.9 (+/−0.67).

TABLE 3

| Label | | S1 | S2 | S3 | S4 | S5 | S6 | S7 | S8 |
|---|---|---|---|---|---|---|---|---|---|
| DE by Mn | % | 3.8 | 6.0 | 7.1 | 7.3 | 10.0 | 10.7 | 11.2 | 13.2 |
| Mn | dalton | 4780 | 2989 | 2541 | 2465 | 1803 | 1679 | 1607 | 1363 |
| intrinsic viscosity at 30° C. | $10^2[\eta_0]$/dl g$^{-1}$ | 13.78 | 9.78 | 7.32 | 6.93 | 6.57 | 5.80 | 6.46 | 5.12 |
| PDI | | 7.06 | 7.97 | 7.09 | 6.74 | 8.46 | 7.49 | 8.64 | 8.26 |
| Label | | S9 | S10 | S11 | S12 | S13 | S14 | S15 | S16 |
| DE by Mn | % | 13.5 | 13.7 | 15.0 | 15.2 | 15.3 | 17.1 | 18.8 | 20.6 |
| Mn | dalton | 1329 | 1318 | 1198 | 1182 | 1176 | 1055 | 959 | 872 |
| intrinsic viscosity at 30° C. | $10^2[\eta_0]$/dl g$^{-1}$ | 5.42 | 5.17 | 6.26 | 4.28 | 4.51 | 5.20 | 5.10 | 3.18 |
| PDI | | 8.66 | 7.45 | 8.51 | 6.64 | 8.20 | 8.53 | 7.49 | 7.17 |

As shown in FIG. 1, the viscosity increases when the DE decreases (means the average molecular weight increases). The viscosity and DE values of the SOA samples or market samples can be fitted into the below curve 101: $Y=34.2276*X^{(-0.7199)}$, where Y represents the viscosity, and X represents the DE value. The value of coefficient of determination for this curve $R^2$ for this curve is 0.8571. As you can see, in FIG. 1, all the SOA samples are located in the region between a lower boundary 102 and an upper boundary 103, where the lower boundary can be represented by the curve $Y=26.3185X^{(-0.7593)}$, while the upper boundary is represented by a curve $Y=28.4785X^{(-0.5406)}$. The area between the lower boundary and the upper boundary represents 95% prediction interval of SOA samples. In another words, statistically, one can be 95% confident that any market sample will fall in the area between the lower boundary and the upper boundary.

In general, the malto-dextrin molecules are classified based on their respective DE values. The viscosities of the products are characterized by the DE values as well. Although the best of the both world can't be obtained at the same time, for formulators to improve the performance of malto-dextrin in their finished products, proper malto-dextrin specifications is critically needed. It has also been pointed out that malto-dextrin manufacturers specified their products with manufacturing control index such as DE value. On the other hand, the important specifications such as viscosity are used at most as a finished product as product information. The detailed study by malto-dextrin users revealed the importance of viscosity to the product performance and never the DE value. (Avaltroni, F. et. al, Carbohydrate Polymers 58 (2004) 323-334).

3. Preparations of Malto-Dextrin Including Process Controls

It has been industry practice to pretreat the raw starch slurry by cooking it thoroughly and then subject the slurry with high temperature alpha-amylase and conduct hydrolysis reaction (also referred as liquefaction reaction). The reaction time is used to control the extent of the progress of the hydrolysis reaction (also referred as liquefaction reaction) by measuring the DE values of the mixtures (also referred as liquefaction liquor) versus the target DE values. Also, the liquor is considered acceptable only when "negative" result in iodine test is obtained to ensure the absence of raw starch starting materials. Malto-dextrin products can then be obtained by further processing of the mixture by filtration to remove the water insoluble materials and spry dry into dried products (when needed).

As mentioned, the DE value directly relates to the number average molecular weight of the material. The lower DE value indicates lower extent of hydrolysis and higher average molecular weight of the resulting materials and vice versa. As reaction proceeds with time, the DE value of the reaction mixture thus develops as time progresses at a given temperature. The DE value of the reaction mixture is directly proportional to the time the mixture is exposed to enzyme at given temperature.

Figure 2:
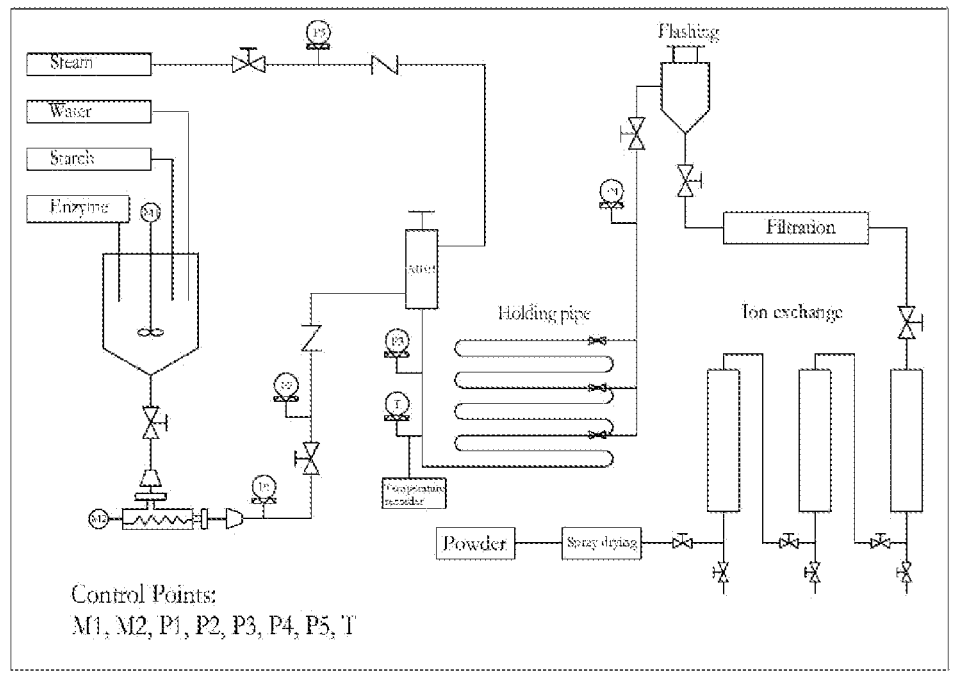
FIG. 2 is a process flow diagram showing the malto-dextrin manufacturing process.

FIG. 2 illustrates the process flow diagram (PFD) that depicts how the starch hydrolysis reaction is carried out in the industry. The first operation is cooking, the raw starch molecules the bound crystal lattices is released into water and hydrated into gelatinized state that is susceptible to enzymatic catalysis of the hydrolysis reaction. It is in common term called "dissolution" of solid state starch into solution starch so the chemical reaction of hydrolysis can proceed.

In this operation, the raw starch is dispersed in water in the slurry tank and pumped to a jet-cooker (a Hydroheater® is used in this study) where sonic velocity steam is injected into high velocity slurry stream so rigorous mixing occurs in heating zone and starch gelatinization takes place instantaneously, all starch molecules are released into gelatinized state (cooked) with accurate targeted temperature (usually at above 100° C.) and the slurry flow through a holding pipe to keep the same temperature/pressure for 3~5 minutes to ensure the thoroughness of the cook before it is released through a pressure relieve valve and flashed to atmospheric pressure for the second operation of liquefaction. Alpha-amylases can be added in the slurry stage so there can be small extent of hydrolysis reaction to take place immediately after gelatinization to reduce molecular size of the gelatinized starch and consequently, the viscosity of the slurry.

In the second unit operation, the cooked slurry flows through a series of liquefaction vessels designed to ensure the desired resident time (usually at 85~95° C. for 30~90 minutes) so the hydrolysis reaction can take place to achieve the targeted DE value. Sometimes extra dosages of alpha-amylases can be added at the beginning of the liquefaction step so the reaction can be better controlled in this stage.

At the completion of the hydrolysis, the resulted malto-dextrin solution is then spray dried and/or packaged as liquid product after filtration and desalination.

4. Broadness of the Molecular Weight Distribution or PDI

The malto-dextrin mixtures generally have molecules with a distribution of molecular weights. While the DE value measures the average molecule weight of the mixture, it does not measure the distribution of the molecular weight. The distribution of the mixture is better described by number average molecular weight $M_w$, weight average molecular weight $M_n$, and poly-disperse-index PDI (PDI=$M_w/M_n$). When all the molecules in the mixture are of the same molecular weight, i.e. $M_w$=$M_n$, the mixture is also called uni-disperse and PDI=1. While in most cases, the mixture is poly-disperse (all molecules in the mixture have different molecular weights, $M_w$ and $M_n$ are not the same and $M_w$ is larger than $M_n$), PDI is the indicator of the broadness of the distribution. Direct fractionation of the mixture (e.g. via Gel Permeation Chromatography) and calibrate against standard molecules with known molecular weights is one known way of measuring $M_w$ and $M_n$ and calculate the PDI.

The broadness of the distribution of the malto-dextrin from the reaction level can be dictated by the catalyst used of hydrolysis reaction. There are distinctly different patterns of distribution if the reaction is acid catalyzed and or enzymes catalyzed. Among the enzymes used to catalyze starch hydrolysis to produce malto-dextrins, *Bacillus licheniformis* and *Bacillus stearothermophilus* are the most commonly used in the industry and some difference in resulting distribution have been reported (U.S. Pat. No. 5,886,168).

(a) Viscosity and Molecular Weight

For a mono-disperse material with given molecular weight M, the viscosity of the material is:

$$[\eta]_0 = kM^\alpha$$

wherein $[\eta]_0$ is the intrinsic viscosity, M is the molecular weight of a monodispersed polymer, and k and $\alpha$ constants are related to the degree of molecular expansion and hence depend upon the local stiffness of the polymer backbone and polymer-solvent interactions.

When the material is poly-disperse, the averaged molecular weight of viscosity is calculated based on the molecular fraction of each components in the distribution.

$$\overline{M_v} = \left( \frac{\sum_i x_i M_i^{\alpha+1}}{\sum_i x_i M_i} \right)^{1/\alpha}$$

However, since heavier molecules contribute more to the viscosity, given the same average molecular weights, poly-disperse mixtures will always exhibits higher viscosity than the mono-disperse material. By the same token, the higher the PDI, the higher the viscosity (when Mn is the same).

(b) Characterization

In the malto-dextrin production industry, the $M_n$ can be quickly obtained by measuring dextrose equivalent (DE) value by Fehling titration and/or osmotic pressure measurement of the aqueous solution of the mixture. Thus, $M_w$ measurement is commonly skipped. Iodine test of the mixture is a common practice to confirm the absence of the starch raw material at the end of the reaction. Blue color of the test result indicate the presence of starch molecules. Thus, a non-blue color of the test result indicate the absence of starch raw materials of the hydrolysis. The actual color of the test result can offer a qualitative estimate of the upper limit of the molecular weight of the mixture. Combining the iodine test result with the measured DE value, one can get an accurate $M_n$ and a rough picture about the broadness of the distribution although Mw cannot be obtained.

(c) Control of Broadness by Liquefaction Reaction Control of the Jet-Cooker.

It is important to note the role of jet-cooker in the control of this reaction. Large quantity of the starch slurry passes through the relatively small heating zone of the jet-cooker. When the injected steam condenses and mixed with the incoming slurry instantaneously that takes all starch molecules to the same temperature at the same time, thus, all of the starch molecules are gelatinized at the same time when they are exposed to heat, enzymes, and water. That will ensure the hydrolysis of all the starch molecules that pass through the jet-cooker will start at the same time. Thus, the control of the residence time in the liquefaction can become effective when.

However, when in the jet-cooker stage, when injected steam were NOT thoroughly condensed and mixed in the heating zone, there will be mixed gas phase materials (un-condensed residual steam bubbles) and liquid phase materials (slurry and hot liquid from freshly condensed steam). The residual steam bubbles travel beyond the heating zone can create hammering in the heater and/or downstream piping and can only be eliminated by proper design of the internals of the heater along with adjustment of the internals so optimum mixing is ensured and the jet-cooker can achieve the heating without any hammering.

Figure 3:
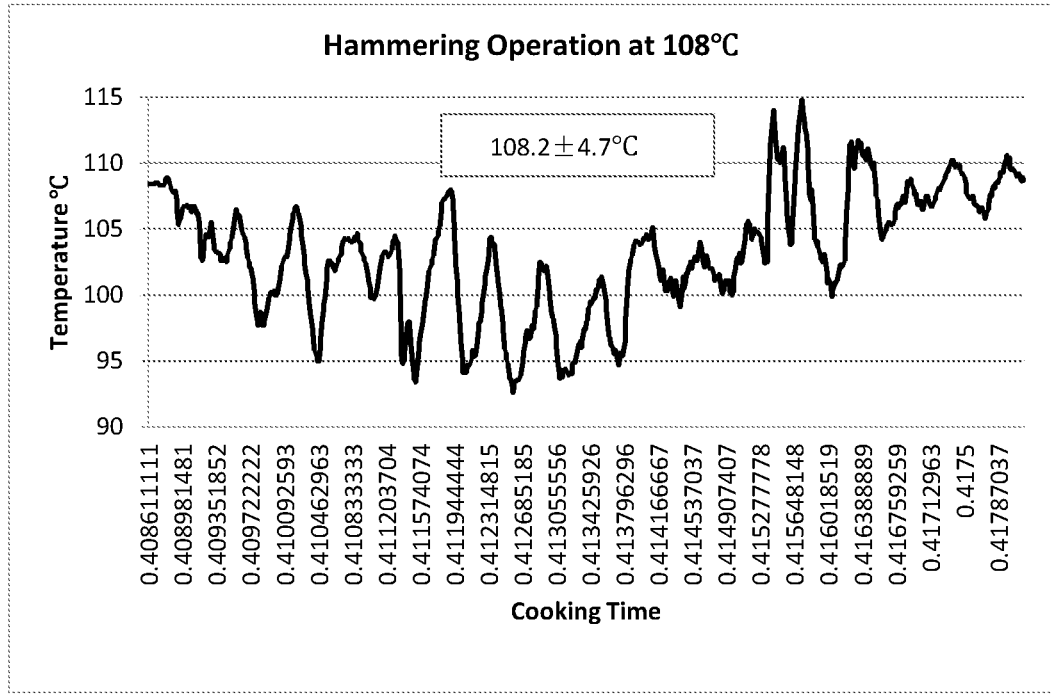
FIG. 3 is a line chart showing the jet-cooking operation with significant hammering and low cooking intensity.
Figure 4:
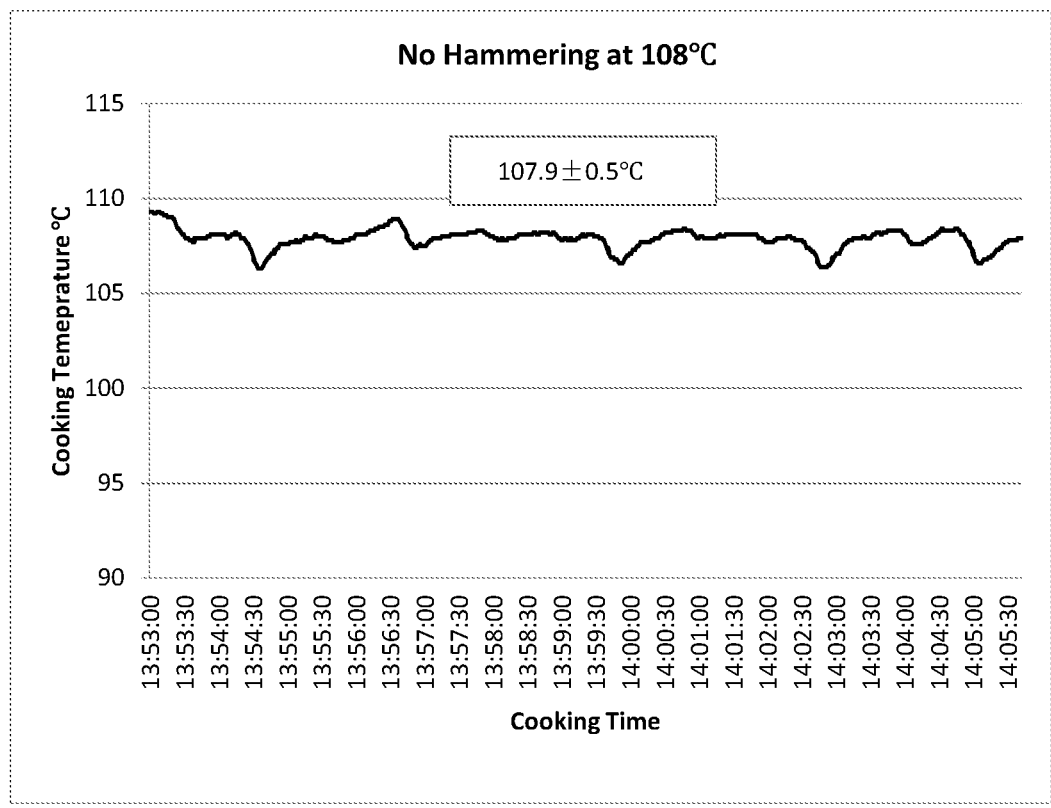
FIG. 4 is a line chart showing the jet-cooking operation with little hammering and high cooking intensity, in accordance with one embodiment of the present invention.

FIG. 3 is a line chart showing the jet-cooking operation with significant hammering and low cooking intensity. FIG. 4 is a line chart showing the jet-cooking operation with little hammering and high cooking intensity, in accordance with one embodiment of the present invention. As shown in FIGS. 3 and 4, when hammering occurs, the temperatures in the jet-cooking stream can range as high as +/−5° C. around the target temperature (FIG. 3), while it can be as precise as +/−0.5° C. around the target temperature (FIG. 4) if hammering is eliminated (with a quiet jet-cooker during the operation).

Although the exact time difference of the onset of liquefaction reaction due to uneven jet-cooking has never been actually measured, observation in the field indicated broadening of the malto-dextrin molecular weight distribution can be significant when the jet cooker is hammering during cooking.

Thus, in the manufacturing of malto-dextrin, there is a second contributing factors to the broadness of product. The control of the jet-cooking can be significant.

Control of the jet-cooker to eliminate hammering and ensure precise temperature control. Hammering and vibration can be common side effects of direct steam injection heating. Comes along with hammering is temperature fluctuation during the heating zone that can span the range of +/−5° C. around the target temperature. However, when strong mechanical shear is applied to heating zone so injected steam can immediately condensed into liquid phase and mixed with cold substrate to be heated so all hammering caused by the presence of residual steam can be significantly reduced, and even eliminated. Generally, the temperature variation can be controlled within +/−0.8° C. Ideally, the temperature variation of the heating zone can be a tight as +/−0.5° C. as demonstrated by Hydroheater® that dedicated mechanism is available to make adjustments of heating zone shear force so zero hammering can be achieved when properly operated. For example, when setting a target temperature at 107.9° C., the actual temperature of starch-water slurry inside the jet-cooker can be preciously controlled within the range of 107.4° C. to 108.4° C.

If one defines cooking intensity I and I=T/(VA) with T=temperature read from the temperature sensor. VA=standard deviation of the temperature read at every one second during the measuring period. In FIG. 3, one can see the cooking intensity I=107.9/0.5=215.8, while for the temperature profile in FIG. 4, the cooking intensity I=108.2/4.7=23, much lower than that in FIG. 3. Field data shown that when read temperature is the same, I has a significant impact on the quality of the jet-cooking and significant impact on the quality of the liquefaction including (but not limited to) the broadness of the distribution of the hydrolysate.

Thus, one of the purpose of this study to demonstrate when Hydroheater® is used as jet-cooker for the starch hydrolysis as indicated in the PFD, with careful adjustment, zero hammering is achieved in the heating zone, resultant malto-dextrin molecular weight distribution can only be as broad as the result of alpha-amylase enzymes profile effect. The contribution from the poor cooking intensity can be minimized.

(d) Control of the Broadness by Trimming Molecular Weight Distribution Through Filtration The broadness of the malto-dextrin can also be "trimmed" or "fractioned" by filtration. To obtain desired segment of the molecules will depend on two factors: (1) extent of hydrolysis, and (2) The filtration cut. The additional cost of this practice consists of cost of the operation and discard of the unwanted portion. In this disclosure, the term "fraction" refers to the process of separating the malto-dextrin composition into two portions (retentate and permeate) with different molecule weight distribution through filtration. The size of the holes in the filters used in fraction is typically much smaller than the size of the holes in the filters used to remove insoluble residuals, which is about 20-40 microns. When the filter membrane has a molecular weight cut-off around 4,000-20,000 Daltons, such a process is commonly referred as "ultrafiltration".

5. GPC

We have used gel permeation chromatography (GPC) to characterize malto-dextrin molecules and analysis in unique/productive way so we can map the informative correlation of composition and viscosity. The liquid obtained by hydrolysis reaction treated by filtration to remove solids. A number of methods can be used such as filter through diatomaceous earth on a Bchner funnel, plate and frame filter, and on a fixed or rotary vacuum filter and the like. The clarified liquid then filtered via a fine grade filter paper.

To obtain GPC data, we measured by treating them with columns of ShoDex OHpak SB-802.5HQ and SB-803HQ on Waters1515-2414 HPLC machine equipped with pump 1515. A linear relationship is obtained between the elution time of the pullulan and the log of its molecular weight.

Intrinsic viscosity of the malto-dextrin material is measured using capillary Ubbelohde viscometer following EST RD SOP 02A standard operating procedures at 30° C.

The three indexes to be followed are viscosity, DE values and iodine test results. The higher valued malto-dextrin products manufacturing process will include control of the manufacturing process by DE values, iodine test results along with viscosity of the products.

6. Our Methods and Results

To control the characteristics of the produced malto-dextrin composition, we carefully control the preparation and purification procedures. The quality of the pretreatment (jet cooking) of the starch slurry is controlled by adjusting (a) the temperature of cooking, (b) the cooking intensity, and (c) the alpha-amylase formulations and dosage. The average molecular weight (DE value) is controlled by liquefaction time and confirmed by DE measurements. The Upper limit of molecular weight is controlled by iodine test.

We have also discovered that by combining the strategies of (a) careful optimization of operating the Hydroheater® to minimum hammering, (b) choosing the proper combination of alpha-amylase and cooking temperatures, and (c) purification with ultrafiltration, we can consistently produce malto-dextrin molecules with significantly lower viscosities than expected.

The embodiment samples with characterization data are listed in Table 4.

TABLE 4

| Label | | I1 | I2 | I3 | I4 | I5 | I6 | I7 | I8 |
|---|---|---|---|---|---|---|---|---|---|
| DE by Mn | % | 3.8 | 5.8 | 6.7 | 6.9 | 7.3 | 7.5 | 8.1 | 9.4 |
| Mn | dalton | 4797 | 3086 | 2694 | 2618 | 2480 | 2385 | 2217 | 1921 |
| intrinsic viscosity at 30° C. | $10^2[\eta_0]$/dl g$^{-1}$ | 7.02 | 5.53 | 6.44 | 4.82 | 5.15 | 6.45 | 6.55 | 5.92 |
| PDI | | 3.62 | 4.63 | 5.75 | 6.18 | 6.30 | 7.55 | 5.63 | 6.97 |

| Label | | I9 | I10 | I11 | I12 | I13 | I14 | I15 | I16 |
|---|---|---|---|---|---|---|---|---|---|
| DE by Mn | % | 9.4 | 10.6 | 11.9 | 12.1 | 13.1 | 14.8 | 15.3 | 16.5 |
| Mn | dalton | 1909 | 1706 | 1508 | 1485 | 1374 | 1216 | 1179 | 1093 |
| intrinsic viscosity at 30° C. | $102[\eta 0]$/dl g-1 | 6.13 | 4.55 | 4.41 | 4.74 | 3.38 | 4.16 | 4.12 | 1.56 |
| PDI | | 6.55 | 5.88 | 5.40 | 6.41 | 1.78 | 5.98 | 6.34 | 3.20 |

Figure 5:
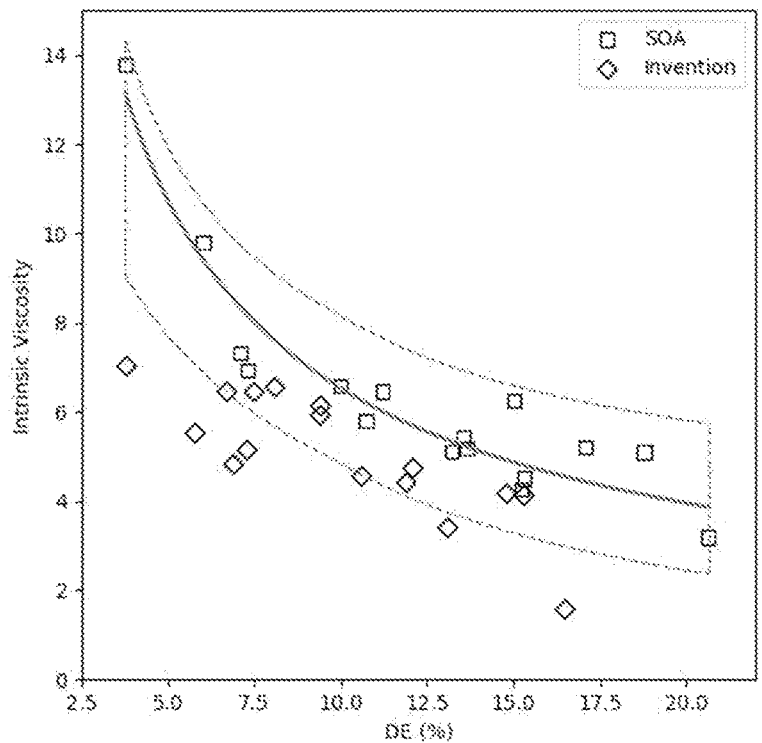
FIG. 5 is a scatter diagram showing the correlation of intrinsic viscosity at 30° C. and DE value of certain market samples and embodiment samples of in accordance with the present invention.

The market samples and embodiment samples are illustrated in FIG. 5, which is a scatter diagram showing the correlation of intrinsic viscosity at 30° C. and DE value of certain market samples and embodiment samples in accordance with the present invention. As shown in FIG. 5, for the same DE value, the viscosity of embodiment samples (including the ultra-fractionated samples and non-ultra-fractionated samples) is significantly lower than the viscosity of the market samples. In particular, the majority of the embodiment samples are below the lower boundary 102, which is represented by the curve $Y=26.3185X^{(-0.7593)}$.

Figure 6:
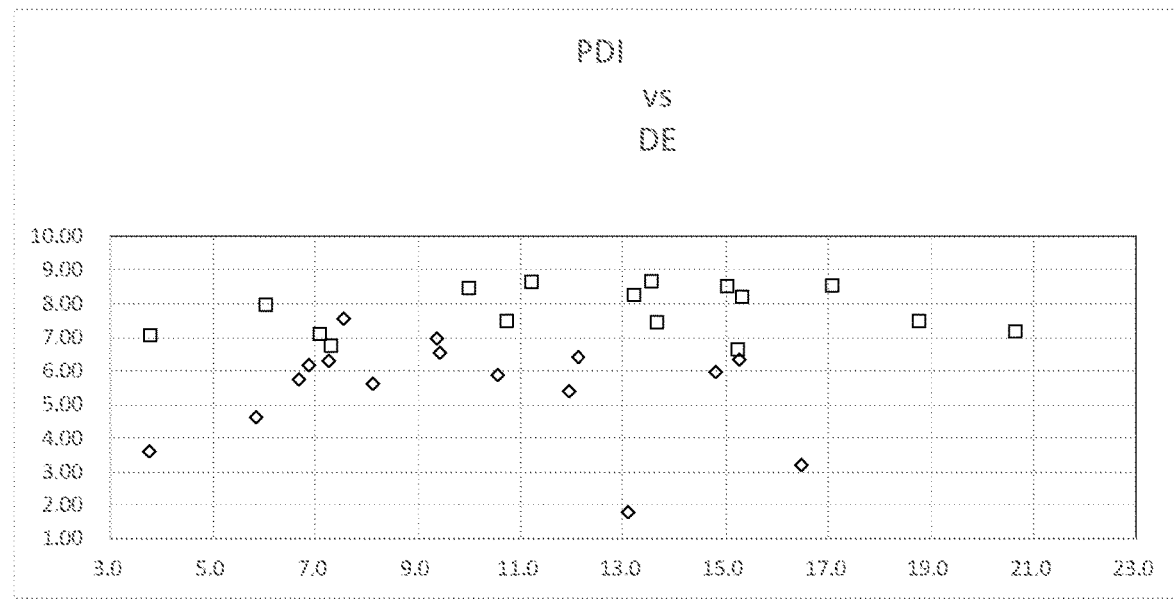
FIG. 6 is a scatter diagram showing the correlation of PDI value and DE value of certain market samples and embodiment samples in accordance with the present invention.

Another characteristic data of the inventive sample—PDI value—significantly decreases at the same DE value than that of the market sample as illustrated in FIG. 6, which is a scatter diagram showing the correlation of PDI value and DE value of certain market samples and embodiment samples in accordance with the present invention.

Hydrolysis reaction control factors used in this invention includes raw material screening and pre-treatment, including raw starches of corn, tapioca, and/or pre-gelatinized starches.

In the control of the hydrolysis reactions, the α-amylases choices include enzymes from *Bacillus stearothermophilus, Bacillus licheniformis, Pseudomonas fluorescens* Biovar I, and the combinations of these enzymes at various dosages. The starch water slurry is pretreated with a Hydroheater® at various temperature and cooking intensity for 5 minutes set up with Hydroheater connected with a holding pipe. The cooking temperature is measured with a PT-100 sensor inserted in the slurry outlet of the Hydroheater®, and the cooking intensity is maximized by adjusting the Hydroheater® so that minimum or no hammering noise is audible by the technician. The reduction of the hammering can be obtained by adjusting the combining tube according to the Hydroheater® technical operational manual published by Hydro-Thermal™ corporation. During our experimentation, cooking intensity was noted as high (no hammering noise), medium (some hammering noise), and poor (heavy hammering with noise and vibration).

Liquefaction of the cooked starch slurry is conducted in glass vessel at controlled temperatures with mechanical stirrer at specified time of duration.

The hydrolyzed products are subject to microfiltration with plate and frame filter and/or Buchner funnel to remove the insoluble residual proteins and fibers in the starch materials (if any). In embodiments of our invention, the malto-dextrin composition obtained at this step is unfractionated, and has a DE value in the range of 6.7-15.3, a viscosity value in the range of 4.12-6.55, a PDI in the range of 5.40-7.55.

The products sometimes (not always) further filter with ultrafiltration membrane of specific cut-off sizes to produce specific range of molecules if desired. To obtain the embodiment sample of low-DE malto-dextrin, we use a ultrafiltration membrane having a molecular weight cut-off between 4,000 to 20,000 daltons. The malto-dextrin composition obtained after ultrafiltration has a DE value in the range of 3.8-16.5, a viscosity value in the range of 1.56-7.02, a PDI in the range of 1.78-6.30.

The preparation strategy in accordance with embodiments of the present invention combine the various preparation methods mentioned above to achieve the process objectives to obtain novel malto-dextrin materials that are desirable for down-stream formations, and when needed, utilize superior analytical techniques and make clear process objectives to enable repeated production of desirable novel materials. The malto-dextrin composition in accordance with embodiments of the present invention, including both composition after ultrafiltration and without ultrafiltration, a DE value in the range of 3.8-16.5, a viscosity value in the range of 1.56-7.02, a PDI in the range of 1.78-7.55.

7. Examples

The manufacturing process of the embodiment samples are illustrated in Table 5.

TABLE 5

| Sample Label | | I1 | I2 | I3 | I4 | I5 | I6 | I7 | I8 |
|---|---|---|---|---|---|---|---|---|---|
| raw material | | tapioca starch | tapioca starch | corn starch | tapioca starch | tapioca starch | corn starch | corn starch | tapioca starch |
| cooking temperature | ° C. | 105 | 105 | 116 | 102.6 | 102.6 | 112 | 116 | 102.6 |
| enzyme at cooking | | SC | SC | SC + supra | supra | supra | supra | SC + supra | supra |
| enzyme dose at cooking | g/kgDS | 0.05 | 0.05 | 1 + 2 | 1 | 1 | 3 | 1.5 + 1.5 | 1 |
| holding time | min | 0 | 0 | 3 | 7.8 | 7.8 | 9.3 | 6 | 7.8 |
| liquefaction temperature | ° C. | 70~100 | 70~100 | 85.2 | 80 | 80 | / | 85 | 80 |
| enzyme at liquefaction | g/kgDS | SC | SC | / | / | / | / | / | / |
| enzyme dose at liquefaction | | 0.45 | 0.45 | / | / | / | / | / | / |
| liquefaction time | min | 60 | 60 | 0 | 58 | 58 | 0 | 0 | 58 |
| iodine test color | | orange red | orange red | orange red | yellow | yellow | aubergine | orange red | yellow |
| First ultrafiltration | retention or permeation | retention | retention | / | retention | retention | / | / | / |
| | membrane type | 8000 Dalton | 8000 Dalton | | 2 W Dalton | 8000 Dalton | | | |
| Second ultrafiltration | retention or permeation | retention | / | | / | / | | | |
| | membrane type | 4000 Dalton | | | | | | | |

TABLE 5-continued

| Sample Label | | I9 | I10 | I11 | I12 | I13 | I14 | I15 | I16 |
|---|---|---|---|---|---|---|---|---|---|
| raw material | | corn starch | tapioca starch | corn starch | tapioca starch | tapioca starch | tapioca starch | corn starch | tapioca starch |
| cooking temperature | °C. | 135 | 105 | 112 | 105 | 105 | 105 | 130 | 102.6 |
| enzyme at cooking | | DSM ultra | SC | supra | SC | SC | SC | supra | supra |
| enzyme dose at cooking | g/kgDS | 0.15 | 0.05 | 3 | 0.05 | 0.05 | 0.05 | 0.1 | 1 |
| holding time | min | 3 | 0 | 12 | 0 | 0 | 0 | 5 | 7.8 |
| liquefaction temperature | °C. | 86~77 | 90 | / | 90 | 70~100 | 90 | 90 | 80 |
| enzyme at liquefaction | g/kgDS | supra | SC | / | SC | SC | SC | supra | / |
| enzyme dose at liquefaction | | 0.2 | 0.4 | / | 0.45 | 0.45 | 0.4 | 0.3 | / |
| liquefaction time | min | 65 | 120 | 0 | 60 | 60 | 120 | 120 | 58 |
| iodine test color | | red | yellow | yellow | orange red | orange red | yellow | yellow | yellow |
| First ultrafiltration retention or permeation membrane type | | / | retention  8000 Dalton | / | / | retention  8000 Dalton | / | / | permeation  8000 Dalton |
| Second ultrafiltration retention or permeation membrane type | | | / | | | permeation  4000 Dalton | | | / |

The present invention will now be described in further detail by means of the examples below.

Example I1 (DE=3.8, Viscosity=7.02)

In the cooking process, raw starch made out of tapioca was dispersed into water to obtain the starch-water slurry. Then the slurry and 0.05 g/kgDS of SC α-amylase were pumped into the Hydroheater® before sonic velocity steam was injected. The slurry was cooked at 105° C., measured with a PT-100 sensor inserted in the slurry outlet of the Hydroheater®. After the cooking, the cooked slurry was released through a pressure relieve valve and flashed to atmospheric pressure for liquefaction.

In the liquefaction process, the cooked slurry flowed through a series of liquefaction vessels at 70~100° C. for 60 minutes. Another 0.45 g/kgDS of SC α-amylase was added into the vessels for better control of the liquefaction. Then the composition was filtered to remove insoluble residual proteins and fibers. After that, the composition was fractionated with the ultrafiltration membrane having a pore size of 8,000 Daltons. The retentate obtained was further fractionated with the ultrafiltration membrane having a pore size of 4,000 Daltons, and the retentate remained.

The GPC data of Example I1, measured by treating it with columns of ShoDex OHpak SB-802.5HQ and SB-803HQ on Waters1515-2414 HPLC machine equipped with pump 1515, was that the $M_n$ was 4797 Daltons. The PDI value was 3.62. The DE value, measured by Fehling titration and/or osmotic pressure measurement of the aqueous solution of the mixture, was 3.8. The viscosity, measured by a capillary Ubbelohde viscometer following EST RD SOP 02A standard operating procedures at 30° C., was 7.02 $10^2[\eta_0]$/dl g$^{-1}$.

Example I2 (DE=5.8, Viscosity=5.53)

The same cooking process and liquefaction process as in Example 1 was used to produce the maltodextrin of Example I2.

The difference in this example is that the composition was fractionated for only one time, with the ultrafiltration membrane having a pore size of 8,000 Daltons, and the retentate remained.

The GPC data of Example I2 was that the $M_n$ was 3086 Daltons. The PDI value was 4.63. The DE value was 5.8. And the viscosity was 5.53 $10^2[\eta_0]$/dl g$^{-1}$.

Example I3 (DE=6.7, Viscosity=6.44)

In the cooking process, raw starch made out of corn was dispersed into water to obtain the starch-water slurry. Then the slurry, 1 g/kgDS of SC and 2 g/kgDS of supra α-amylase were pumped into the Hydroheater®. The slurry was cooked at 116° C. for 3 minutes. After the cooking, the cooked slurry was released through a pressure relieve valve and flashed to atmospheric pressure for liquefaction.

In the liquefaction process, the cooked slurry flowed through a series of liquefaction vessels at 85.2° C. Then the composition was filtered to remove insoluble residual proteins and fibers.

The GPC data of Sample I3 was that the $M_n$ was 2694 Daltons. The PDI value was 5.75. The DE value was 6.7. And the viscosity was 6.44 $10^2[\eta_0]$/dl g$^{-1}$.

Example I4 (DE=6.9, Viscosity=4.82)

In the cooking process, raw starch made out of tapioca was dispersed into water to obtain the starch-water slurry. Then the slurry and 1 g/kgDS of supra α-amylase were pumped into the Hydroheater®. The slurry was cooked at 102.6° C. for 7.8 minutes. After the cooking, the cooked slurry was released through a pressure relieve valve and flashed to atmospheric pressure for liquefaction.

In the liquefaction process, the cooked slurry flowed through a series of liquefaction vessels at 80° C. for 58 minutes. Then the composition was filtered to remove insoluble residual proteins and fibers. After that, the composition was further fractionated with the ultrafiltration membrane having a pore size of 20,000 Daltons, and the retentate remained.

The GPC data of Example I4 was that the $M_n$ was 2618 Daltons. The PDI value was 6.18. The DE value was 6.9. And the viscosity was 4.82 $10^2[\eta_0]$/dl g$^{-1}$.

Example I5 (DE=7.3, Viscosity=5.15)

The same cooking process and liquefaction process as in Example I4 was used to produce the maltodextrin of Example I5.

The difference in this example is that the composition was further fractionated with the ultrafiltration membrane having a pore size of 8,000 Daltons, and the retentate remained.

The GPC data of Example I5 was that the $M_n$ was 2480 Daltons. The PDI value was 6.30. The DE value was 7.3. And the viscosity was 5.15 $10^2[\eta_0]$/dl g$^{-1}$.

Example I6 (DE=7.5, Viscosity=6.45)

In the cooking process, raw starch made out of corn was dispersed into water to obtain the starch-water slurry. Then the slurry and 3 g/kgDS of supra α-amylase were pumped into the Hydroheater®. The slurry was cooked at 112° C. for 9.3 minutes. After the cooking, the cooked slurry was released through a pressure relieve valve and flashed to atmospheric pressure for liquefaction.

Then the composition obtained after the liquefaction process was filtered to remove insoluble residual proteins and fibers.

The GPC data of Example I6 was that the $M_n$ was 2385 Daltons. The PDI value was 7.55. The DE value was 7.5. And the viscosity was 6.45 $10^2[\eta_0]$/dl g$^{-1}$.

Example I7 (DE=8.1, Viscosity=6.55)

In the cooking process, raw starch made out of corn was dispersed into water to obtain the starch-water slurry. Then the slurry, 1.5 g/kgDS of SC and 1.5 g/kgDS of supra α-amylase were pumped into the Hydroheater®. The slurry was cooked at 116° C. for 6 minutes. After the cooking, the cooked slurry was released through a pressure relieve valve and flashed to atmospheric pressure for liquefaction.

In the liquefaction process, the cooked slurry flowed through a series of liquefaction vessels at 85° C. Then the composition was filtered to remove insoluble residual proteins and fibers.

The GPC data of Example I7 was that the $M_n$ was 2217 Daltons. The PDI value was 5.63. The DE value was 8.1. And the viscosity was 6.55 $10^2[\eta_0]$/dl g$^{-1}$.

Example I8 (DE=9.4, Viscosity=5.92)

In the cooking process, raw starch made out of tapioca was dispersed into water to obtain the starch-water slurry. Then the slurry and 1 g/kgDS of supra α-amylase were pumped into the Hydroheater®. The slurry was cooked at 102.6° C. for 7.8 minutes. After the cooking, the cooked slurry was released through a pressure relieve valve and flashed to atmospheric pressure for liquefaction.

In the liquefaction process, the cooked slurry flowed through a series of liquefaction vessels at 80° C. for 58 min. Then the composition was filtered to remove insoluble residual proteins and fibers.

The GPC data of Example I8 was that the $M_n$ was 1921 Daltons. The PDI value was 6.97. The DE value was 9.4. And the viscosity was 5.92 $10^2[\eta_0]$/dl g$^{-1}$.

Example I9 (DE=9.4, Viscosity=6.13)

In the cooking process, raw starch made out of corn was dispersed into water to obtain the starch-water slurry. Then the slurry and 0.15 g/kgDS of DSM ultra α-amylase were pumped into the Hydroheater®. The slurry was cooked at 135° C. for 3 minutes. After the cooking, the cooked slurry was released through a pressure relieve valve and flashed to atmospheric pressure for liquefaction.

In the liquefaction process, the cooked slurry flowed through a series of liquefaction vessels at 77~86° C. for 65 minutes. Another 0.2 g/kgDS of supra α-amylase was added into the vessels for better control of the liquefaction. Then the composition was filtered to remove insoluble residual proteins and fibers.

The GPC data of Example I9 was that the $M_n$ was 1909 Daltons. The PDI value was 6.55. The DE value was 9.4. And the viscosity was 6.13 $10^2[\eta_0]$/dl g$^{-1}$.

Example I10 (DE=10.6, Viscosity=4.55)

In the cooking process, raw starch made out of tapioca was dispersed into water to obtain the starch-water slurry. Then the slurry and 0.05 g/kgDS of SC α-amylase were pumped into the Hydroheater®. The slurry was cooked at 105° C. After the cooking, the cooked slurry was released through a pressure relieve valve and flashed to atmospheric pressure for liquefaction.

In the liquefaction process, the cooked slurry flowed through a series of liquefaction vessels at 90° C. for 120 minutes. Another 0.4 g/kgDS of SC α-amylase was added into the vessels for better control of the liquefaction. Then the composition was filtered to remove insoluble residual proteins and fibers. After that, the composition was further fractionated with the ultrafiltration membrane having a pore size of 8,000 Daltons, and the retentate remained.

The GPC data of Example I10 was that the $M_n$ was 1706 Daltons. The PDI value was 5.88. The DE value was 10.6. And the viscosity was 4.55 $10^2[\eta_0]$/dl g$^{-1}$.

Example I11 (DE=11.9, Viscosity=4.41)

In the cooking process, raw starch made out of corn was dispersed into water to obtain the starch-water slurry. Then the slurry and 3 g/kgDS of supra α-amylase were pumped into the Hydroheater®. The slurry was cooked at 112° C. for 12 min. After the cooking, the cooked slurry was released through a pressure relieve valve and flashed to atmospheric pressure for liquefaction.

Then the composition obtained after the liquefaction process was filtered to remove insoluble residual proteins and fibers.

The GPC data of Example I11 was that the $M_n$ was 1508 Daltons. The PDI value was 5.40. The DE value was 11.9. And the viscosity was 4.41 $10^2[\eta_0]$/dl g$^{-1}$.

Example I12 (DE=12.1, Viscosity=4.74)

In the cooking process, raw starch made out of tapioca was dispersed into water to obtain the starch-water slurry. Then the slurry and 0.05 g/kgDS of SC α-amylase were pumped into the Hydroheater®. The slurry was cooked at 105° C. After the cooking, the cooked slurry was released through a pressure relieve valve and flashed to atmospheric pressure for liquefaction.

In the liquefaction process, the cooked slurry flowed through a series of liquefaction vessels at 90° C. for 60 minutes. Another 0.45 g/kgDS of SC α-amylase was added into the vessels for better control of the liquefaction. Then the composition was filtered to remove insoluble residual proteins and fibers.

The GPC data of Example I12 was that the $M_n$ was 1485 Daltons. The PDI value was 6.41. The DE value was 12.1. And the viscosity was 4.74 $10^2[\eta_0]$/dl $g^{-1}$.

Example I13 (DE=13.1, Viscosity=3.38)

The same cooking process as in Example I12 was used to produce the maltodextrin of Example I13.

In the liquefaction process, the cooked slurry flowed through a series of liquefaction vessels at 70~100° C. for 60 minutes. Another 0.45 g/kgDS of SC α-amylase was added into the vessels for better control of the liquefaction. Then the composition was filtered to remove insoluble residual proteins and fibers. After that, the composition was fractionated with the ultrafiltration membrane having a pore size of 8,000 Daltons. The retentate obtained was further fractionated with the ultrafiltration membrane having a pore size of 4,000 daltons, and the permeate remained.

The GPC data of Example I13 was that the $M_n$ was 1374 Daltons. The PDI value was 1.78. The DE value was 13.1. And the viscosity was 3.38 $10^2[\eta_0]$/dl $g^{-1}$.

Example I14 (DE=14.8, Viscosity=4.16)

The same cooking process as in Example I12 was used to produce the maltodextrin of Example I14.

In the liquefaction process, the cooked slurry flowed through a series of liquefaction vessels at 90° C. for 120 minutes. Another 0.4 g/kgDS of SC α-amylase was added into the vessels for better control of the liquefaction. Then the composition was filtered to remove insoluble residual proteins and fibers.

The GPC data of Example I14 was that the $M_n$ was 1216 Daltons. The PDI value was 5.98. The DE value was 14.8. And the viscosity was 4.16 $10^2[\eta_0]$/dl $g^{-1}$.

Example I15 (DE=15.3, Viscosity=4.12)

In the cooking process, raw starch made out of corn was dispersed into water to obtain the starch-water slurry. Then the slurry and 0.1 g/kgDS of supra α-amylase were pumped into the Hydroheater®. The slurry was cooked at 130° C. for 5 minutes. After the cooking, the cooked slurry was released through a pressure relieve valve and flashed to atmospheric pressure for liquefaction.

In the liquefaction process, the cooked slurry flowed through a series of liquefaction vessels at 90° C. for 120 minutes. Another 0.3 g/kgDS of supra α-amylase was added into the vessels for better control of the liquefaction. Then the composition was filtered to remove insoluble residual proteins and fibers.

The GPC data of Example I15 was that the $M_n$ was 1179 Daltons. The PDI value was 6.34. The DE value was 15.3. And the viscosity was 4.12 $10^2[\eta_0]$/dl $g^{-1}$.

Example I16 (DE=16.5, Viscosity=1.56)

In the cooking process, raw starch made out of tapioca was dispersed into water to obtain the starch-water slurry. Then the slurry and 1 g/kgDS of supra α-amylase were pumped into the Hydroheater®. The slurry was cooked at 102.6° C. for 7.8 min. After the cooking, the cooked slurry was released through a pressure relieve valve and flashed to atmospheric pressure for liquefaction.

In the liquefaction process, the cooked slurry flowed through a series of liquefaction vessels at 80° C. for 58 minutes. Then the composition was filtered to remove insoluble residual proteins and fibers. After that, the composition was further fractionated with the ultrafiltration membrane having a pore size of 8,000 Daltons, and the permeate remained.

The GPC data of Example I16 was that the $M_n$ was 1093 Daltons. The PDI value was 3.20. The DE value was 16.5. And the viscosity was 1.56 $10^2[\eta_0]$/dl $g^{-1}$.

Please note that the drawings are merely illustrative of this invention and are not necessarily drawn to scale. Throughout the drawing, like reference numbers indicate identical or similar elements, so any duplicate description of them will be omitted. The represented blocks in the drawing are purely functional entities, which do not necessarily correspond to physically separated entities. In other words, these functional entities may be implemented as software, or entirely or in part in one or more software-hardened modules, or in different networks and/or processor devices and/or microcontroller devices.

The flowcharts represented in the drawings are merely illustrative and do not necessarily include all shown steps. For example, some of these steps may be divided, while some can be at least partially combined. Therefore, the actual order in which they are performed may vary depending on the actual conditions.

The accompanying drawings are merely illustrative of a series of processes included in the method according to some embodiments of this invention and are not intended to be limiting. It will be readily appreciated that the way in which the processes are illustrated does not indicate any chronological order of them or limit them to a particular chronological order. Furthermore, it will also be readily appreciated that the processes may be performed, for example, synchronously or asynchronously in multiple modules.

Other embodiments of this invention will be apparent to those skilled in the art from considering the specification and practicing the embodiments disclosed herein. Accordingly, this disclosure is intended to cover all and any variations, uses, or adaptations of this invention which follow, in general, the principles thereof and include such departures from this invention as come within common knowledge or customary practice within the art to which this invention pertains. It is also intended that the specification and examples be considered as exemplary only, with true scope and spirit of this invention being indicated by the appended claims.

It is to be understood that this invention is not limited to the exact structures as described above and illustrated in the drawings and may be modified or changed without departing from its scope. The scope of this invention is intended to be defined only by the appended claims.

It should be noted that although several modules or units of devices for tacking actions have been mentioned in the detailed description above, such division is not mandatory. Indeed, in accordance with embodiments of this invention, the features and functions of two or more modules or units described above may be embodied in one module or unit. Conversely, the features and functions of one of the modules or units described above may be further divided into multiple modules or units.

The invention claimed is:

1. A method for preparing a malto-dextrin composition, the method comprising:
    dispersing raw starch in water to obtain a starch-water slurry;

preheating the starch-water slurry with a jet-cooker for a first duration at a first temperature above 100° C. having a temperature variation no more than 0.8° C.;

hydrolyzing the slurry by treating the slurry with an α-amylase for a second duration at a second temperature; and filtering the hydrolyzed slurry to remove insoluble residual proteins and fibers and obtain an un-fractionated malto-dextrin composition comprising a dextrose equivalent (DE) in the range of 3 to 10, and an intrinsic viscosity measured at 30° C. lower than $26.3185*DE^{(-0.7593)}$ $10^2[\eta_0]$/dl $g^{-1}$.

2. The method of claim 1, wherein the jet-cooker is configured to generate a hammering noise during an operation process.

3. The method of claim 1, wherein the temperature variation is controlled by adjusting the jet-cooker so that no hammering noise is audible.

4. The method of claim 1, wherein the temperature variation is no more than 0.5° C.

5. The method of claim 1, wherein the first temperature is in the range of 107.4 to 108.4° C.

6. The method of claim 1, wherein the first duration is between 3 to 5 minutes.

7. The method of claim 1, wherein the second temperature is in the range of 85~95° C.

8. The method of claim 1, wherein the second duration is in the range of 30 to 90 minutes.

9. The method of claim 1, wherein the α-amylase is selected from a group consisting of *Bacillus stearothermophilus, Bacillus licheniformis*, and *Pseudomonas fluorescens* Biovar I.

10. The method of claim 1, wherein un-fractionated malto-dextrin composition comprises a blue value in the range of 0.02 to 0.28, a polydispersity index (PDI) in the range of about 1.78 to 6.55 and an intrinsic viscosity measured at 30° C. in the range of 3 to 7 $10^2[\eta_0]$/dl $g^{-1}$.

11. The method of claim 1, wherein the un-fractionated malto-dextrin composition comprises a blue value in the range of 0.02 to 0.28, a dextrose equivalent (DE) in the range of 3 to 10, and an intrinsic viscosity measured at 30° C. lower than $26.3185*DE^{(-0.7593)}$ $10^2[\eta_0]$/dl $g^{-1}$.

12. The method of claim 1, further comprising:
fractionating the un-fractionated composition with an ultrafiltration membrane having a molecular weight cut-off of between 4,000 Daltons to 20,000 Daltons to obtain a retentate and a permeate, wherein the retentate is retained as a fractionated malto-dextrin composition.

13. The method of claim 12, wherein the fractionated malto-dextrin composition comprises a blue value in the range of 0.02 to 0.28, a dextrose equivalent (DE) in the range of 3 to 10, and an intrinsic viscosity measured at 30° C. lower than $26.3185*DE^{(-0.7593)}$ $10^2[\eta_0]$/dl $g^{-1}$.

\* \* \* \* \*